Feb. 21, 1950 V. R. DRUM 2,498,534
SPLATTER SHIELD FOR FRYING PANS AND THE LIKE
Filed July 26, 1947
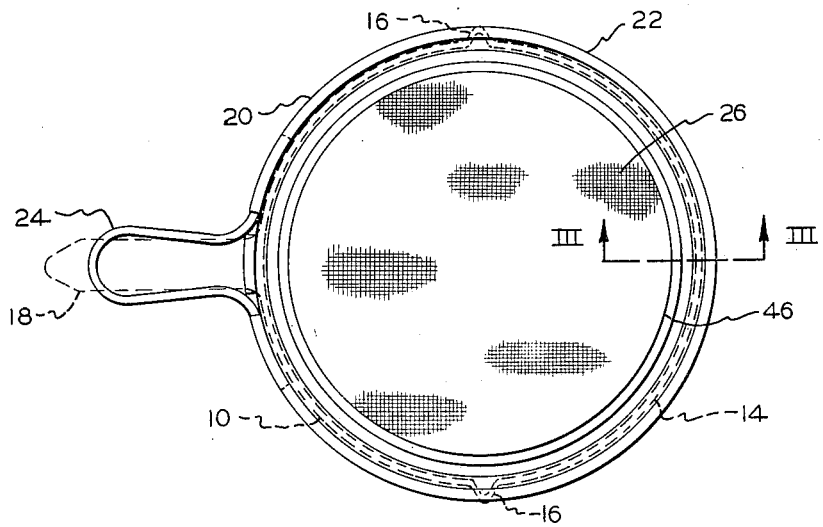
FIG. I.
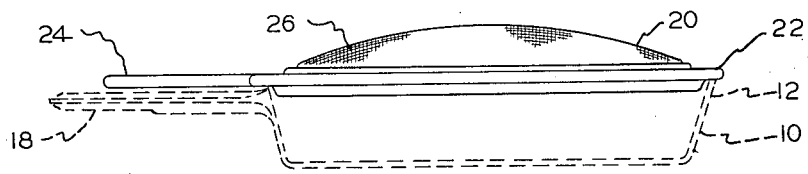
FIG. II.
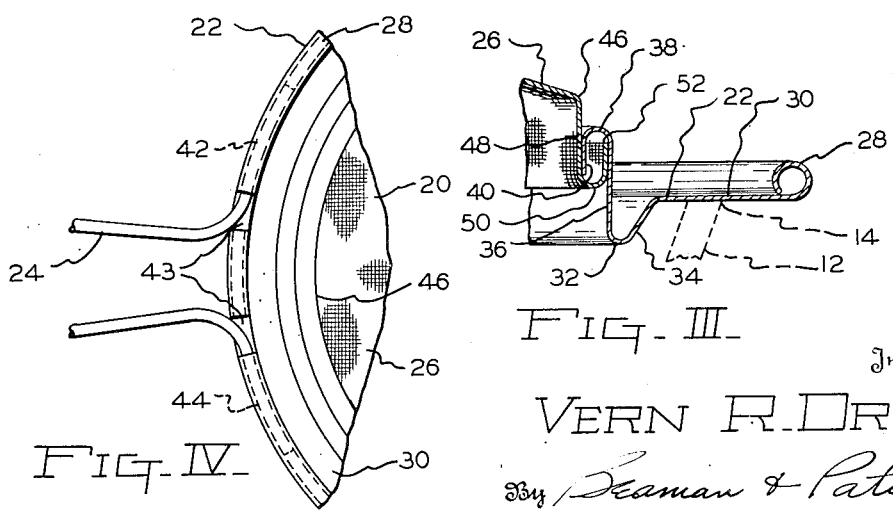
FIG. III.
FIG. IV.
Inventor
VERN R. DRUM
By Seaman & Patch
Attorneys Patented Feb. 21, 1950

2,498,534

UNITED STATES PATENT OFFICE 2,498,534

SPLATTER SHIELD FOR FRYING PANS AND THE LIKE

Vern R. Drum, Detroit, Mich.

Application July 26, 1947, Serial No. 763,935

2 Claims. (Cl. 220—24)

This invention relates to covers or lids to be used on cooking utensils, and more particularly to a splatter shield to be used in connection with frying pans or similar cooking utensils.

At the present time the available covers or lids to be used with frying pans and the like to prevent the splattering of grease therefrom are imperforate and are normally made from metal. While such a completely closed and opaque cover effectively performs its function in stopping the splatter of grease outside the frying pan, it has two main objections in use, particularly in connection with the frying of articles such as meat. The first objection to this known lid is that as it is opaque in order to determine the progress of the cooking operation the lid must be removed from the pan to see inside the same. When the lid is thus removed, even though only momentarily, grease will splatter and splash out from the frying pan and onto the adjacent areas of the stove and walls, and this often with discomfort to the person handling the lid. The second objection to the known form of opaque and imperforate lid is that it retains all steam and condensation products inside the frying pan so that these condense on the inside of the lid and by dropping back into the hot grease cause further snapping and splashing to take place inside the pan. Further with this known type of lid, in order to brown the meat or other substance being cooked, it is necessary to remove the cover, or to slightly offset it, so that the entrained steam may escape and thereby allow the meat to brown in its own juices.

It is therefore an object of this invention to provide a cover or lid for a frying pan or the like which is free from the above described objections and defects and which cover is transparent so that it is possible to observe the process of the cooking operation therethrough while the lid is still in position on the frying pan or like cooking vessel.

A further object of this invention is to provide a cover for a frying pan or like cooking vessel which will allow the steam given off during cooking to escape from the frying pan, thereby allowing the food to brown slowly as it cooks.

A still further object is to provide a cover which may be used as a hand shield to protect the cook from the splattering grease when it is necessary to lift the cover to move the substance being cooked, or to turn it over in the pan.

Further objects and advantages of my invention will be apparent from the following specification when considered in connection with the appended claims and the accompanying drawings, in which Fig. I is a plan view of my splatter shield, with a frying pan denoted in dotted outline, Fig. II is a side elevational view of Fig. I, Fig. III is a detail sectional view on the line 3—3 of Fig. I, and Fig. IV is a detail plan view showing the method used to retain the handle in connection with the shield proper.

In the drawings, the frying pan 10 is shown having the usual upstanding wall portion 12; a peripheral rim 14, a plurality of pouring spout portions 16 and a handle 18.

The antisplatter lid 20 comprises an outer ring portion 22, a handle portion 24, and an inner shield portion 26. The ring portion 22, a cross section of which appears in Fig. III, comprises an upstanding annular bead 28 rolled from the material of the ring 22, and formed as an outer edge of the flat portion 30 which is adapted to rest on the peripheral edge 14 of the frying pan 10. Formed of the metal of the ring 22 and inside of this flat portion 30 is the recess portion 32 composed of the annular down-turned wall 34 and the annular upturned wall 36, and positioned so as to fit inside the pan space defined by the wall 12 when the shield 22 is in position on a frying pan 10. The upper edge of the wall 36 extends above the flat portion 30 and is rolled over, as at 38, presenting a down-turned wall 40, the purpose of which will be described later.

The handle 24 is preferably formed of a single piece of wire bent into substantially U-shape and presenting outwardly directed terminal ends 42 and 44 which are conventionally secured on the lid by being retained in the bead 28 when the latter is rolled to shape, the bead being formed with cut-outs 43 for the passage of the handle to the outside. It will be found that this method of attachment of the handle 24 to the ring 22 is sufficiently strong to carry the weight of the lid 20.

The antisplatter shield proper is indicated at 26 and is shown as being of a smaller diameter than the remainder of the lid and concentric with the outer ring 22. Also, the antisplatter shield is shown as being of domed or bowed formation whereby it presents a concave surface to the interior of the frying pan when the lid is in position thereon. This antisplatter shield 26 has a foraminous surface and is formed so as to be transparent, whereby not only does the foraminous surface permit steam and other condensation products to escape to the outside of the frying pan when the lid is in operative position during frying, but it is also possible to observe from the outside what is happening within the frying pan.

The antisplatter shield 26 terminates at its outer periphery 46 in a depending wall 48, which latter is bent from its lower end, as indicated at 50, to provide an upstanding peripheral wall 52 which is spaced from the wall 48 and forms an open channel into which the depending wall 40 on the ring portion 22 can fit so as to have firm contact with the opposed downturned wall 48 of the shield 26, while at the same time the upstanding wall 52 of the latter has firm contact with the opposed wall 52 of the said ring portion 22. The whole arrangement forms a neat and efficient interlocking joint which can be completed or made permanent by welding or by pressing, for example.

Preferably the foraminous surface of the shield 26 is provided by wire coils or by wire mesh materials from which the shield is formed. The construction is such that the grease which splatters within the frying pan while the lid is in position thereon and which strikes the concave interior surface of the shield 26 will normally be stopped by reason of the pertinence of the shield and will flow towards the peripheral edge portion 46 of the latter. Such a flow of splattered grease within the frying pan will tend to take place and will continue down the upstanding sidewall 48 to the bend 50, from whence this grease will tend to flow over to and down the wall 36. These wall surfaces of the lid in fact form a trap which constrains the splattered grease to drain downward from the lid and back into the frying pan.

In the use of the antisplatter shield, the food to be fried is placed in the frying pan 10 together with the necessary grease. The splatter shield 20 is then placed over the frying pan 10, with the flat portion 30 resting on the peripheral edge 14 and the frying operation commenced. The splatter shield 20 may be positioned in relation to the frying pan as shown in Fig. I, with the handle 24 lying over the handle 18, or it may be positioned on the frying pan 10 with the handle 24 positioned at an angle to, rather than parallel with, the handle 18. If it becomes necessary to turn the food over in the frying pan, the handle 24 may be grasped with one hand and the shield 20 slightly tilted so the cook may reach around the shield 20 to get at the food. Also the cook may lift the lid and hold the shield in front of her face to afford protection against splattered grease. I have found that the construction of the foraminous shield from wire mesh or gauze of the order of the conventional fly screen is satisfactory for the purpose stated.

Having thus described my invention, what I claim as new and desire to protect by Letters Patent is:

1. A splatter shield for frying pans and the like comprising a relatively narrow sheet metal annular rim having an outer peripheral upturned edge portion, an inner peripheral edge portion in the form of a downwardly opening annular channel, a web portion connecting said inner and outer peripheral edge portions, said web portion having a part thereof shaped into a depending flange extending below said edge portions, a crowned annular fine mesh wire central portion disposed within said rim, the outer peripheral edge of said central portion being reversely bent and disposed in said channel.

2. A splatter shield as defined in claim 1 wherein said upturned edge portion is in the form of a rolled tubular edge, circumferentially spaced openings defined in said rolled edge, and a handle having lateral extensions extending through said openings into telescoping relationship with portions of said rolled edge.

VERN R. DRUM.

REFERENCES CITED

The following references are of record in the file of this patent:

UNITED STATES PATENTS

| Number | Name | Date |
|---|---|---|
| 869,746 | Spottswood | Oct. 29, 1907 |
| 1,368,007 | Zimmermann et al. | Feb. 8, 1921 |
| 1,413,579 | Gill | Apr. 25, 1922 |
| 2,002,237 | Roland | May 21, 1935 |

FOREIGN PATENTS

| Number | Country | Date |
|---|---|---|
| 296,398 | Italy | May 16, 1932 |
| 534,591 | Germany | Sept. 29, 1931 |